United States Patent [19]

Manca et al.

[11] 3,844,376

[45] Oct. 29, 1974

[54] CLAMSHELL NOISE SHIELD FOR ENGINE EXHAUST

[75] Inventors: Michael E. Manca, Bellevue; Robert H. Drinnon, Kent, both of Wash.

[73] Assignee: The Boeing Company, Seattle, Wash.

[22] Filed: Apr. 30, 1973

[21] Appl. No.: 356,038

[52] U.S. Cl......... 181/33 HC, 181/33 B, 181/33 E, 181/33 HD, 239/265.13, 239/265.19
[51] Int. Cl............................................. B64d 33/06
[58] Field of Search............ 181/33 B, 33 E, 33 HB, 181/33 HC, 33 HD; 239/265.13, 265.17, 265.19, 265.23, 265.33, 265.37

[56] References Cited
UNITED STATES PATENTS

| | | | |
|---|---|---|---|
| 2,625,008 | 1/1953 | Crook | 239/265.33 X |
| 3,027,710 | 4/1962 | Maytner | 181/33 HC UX |
| 3,174,282 | 3/1965 | Harrison | 181/33 HC UX |
| 3,568,792 | 3/1971 | Urquhart | 181/33 HC UX |
| 3,621,933 | 11/1971 | Raynes | 181/33 E |
| 3,655,007 | 4/1972 | Hilbig | 181/33 E |
| 3,655,008 | 4/1972 | Millman | 181/33 E |

FOREIGN PATENTS OR APPLICATIONS

| | | | |
|---|---|---|---|
| 1,436,412 | 3/1966 | France | 181/33 HC |
| 987,507 | 3/1965 | Great Britain | 181/33 HC |

Primary Examiner—Richard B. Wilkinson
Assistant Examiner—John F. Gonzales
Attorney, Agent, or Firm—H. Gus Hartman; Glenn Orlob

[57] ABSTRACT

A sound suppression apparatus for a jet engine mounted in a nacelle wherein the exhaust nozzle duct comprises a variable ramp as the lower surface thereof. A pair of panels are translatable longitudinally and outwardly pivotable about a longitudinal hinge, on each side of the engine nacelle. When the panels are in their forward stowed position, their external shape conforms to that of the streamlined nacelle or the tail enclosure of an aircraft fuselage in the preferred embodiment of the invention. For the sound suppression mode of airplane operation, i.e., during low speed flight at takeoff and landing, the panels are translated from their stowed position adjacent to the engine, to an aft and outwardly open position whereat the panels form an upward opening deflecting surface about the exhaust nozzle flow.

Operating independently of the panels, is a variable ramp which forms the lower surface of the exhaust nozzle duct. When the panels are translated aft and opened outwardly, the ramp is lowered to a position such that its upper surface is aligned below the engine thrust flow at the exhaust nozzle exit plane, so as to form a space therebetween. The inner surface of the panels when extended, form a pair of rearwardly converging surfaces which are angled and positioned to deflect the free airstream flow adjacent to the nacelle, into the engine exhaust flow. More particularly, the panels direct the streamwise airflow into the exhaust nozzle flow, so as to come in underneath the engine exhaust flow as an intermediate fluid stream between the lower surface of the aft extending nozzle ramp and the engine exhaust flow. This injected intermediate flow produces a mixed boundary layer region adjacent to and throughout the length of: the aft extending ramp surface, and the length of the side panel noise shields. This mixed boundary layer fluid detaches or deflects the engine thrust noise flow. Normally, the engine noise flow will follow the surface contour of the exhaust nozzle duct and spill over the end of the duct exit; thereby, causing the flow containing the noise to turn downwardly. However, by injecting the intermediate fluid, the engine noise flow is turned upwardly, and the downward radiation of the noise is decreased.

2 Claims, 5 Drawing Figures

PATENTED OCT 29 1974

3,844,376

3,844,376

CLAMSHELL NOISE SHIELD FOR ENGINE EXHAUST

SUMMARY OF THE INVENTION

One of the problems confronting the present day operation of jet aircraft, is the amount or intensity of engine exhaust noise over the surrounding airport community during aircraft takeoff, climb out, letdown and landing. Through the use of the present invention, during these modes of aircraft operation, the engine exhaust noise can be shielded from the ground so that people on the ground won't hear it. Generally, there is little concern about the upward noise emission of an airplane. Therefore by deflecting the noise upwardly through the use and proper location of shielding devices, the downward radiation of the sound waves can be diminished. Also, by introducing an intermediate fluid flow between the engine exhaust flow and the aft extending noise shielding surfaces, the downward rediation of the noise energy can be reduced. This injection of intermediate fluid flow causes a fluid mixing region or boundary layer, which decreases the noise energy in the lower portion of the exhaust gas flow and thereby decreases the downward angle of noise radiation.

More particularly, the invention relates to a jet engine mounted in the tail portion of an aircraft fuselage having a T-tail and an air inlet duct on top of the fuselage and wherein the noise shields are housed in the sides of the fuselage when not in use. When the noise shields or panels are utilized for the sound suppression mode, they are translated aft along the sides of the fuselage until a substantial portion thereof extends beyond the exhaust nozzle exit plane. Also, as they are translated to the aft position, they are opened outwardly from the top and pivot about a longitudinal hinge line along the lower portion of the engine exhaust duct. Operating independently of, but in conjunction with the panels, is a variable ramp, which comprises the lower surface of the exhaust nozzle duct and extends aft beyond the exhaust nozzle exit plane at the cruise condition. The ramp is lowered with aft translation and outward opening of the panels. This lowering of the ramp, permits the airstream flow which has been deflected by the panels, to be directed in underneath the exhaust flow from the jet engine. This intermediate fluid flow forms a mixed flow region or boundary layer between the engine flow containing the noise and the aft extending ramp surface including the panels which are positioned adjacent thereto. This boundary layer region functions to prevent the engine noise from impinging on and following the surfaces of the ramp and adjacent panels, thereby, causing them to function as a deflecting noise shield for turning the sound upwardly. Unless this intermediate flow is introduced beneath the engine exhaust flow, the engine noise contained in the flow would not be deflected upwardly, but would follow the contours of the ramp and panels by sticking right to their surfaces and spilling or coming off over their aft terminus as if there were nothing there to shield or deflect the noise from radiating downwardly.

For example, when you hold a megaphone up to your mouth it is very effective because the voice follows right down the side surface of the megaphone. But, if you hold it away from your mouth, it is nowhere nearly as effective. Therefore, in order to suppress the noise in the shortest possible length, so that it will be reflected upwards and not follow the surface of the shield like a megaphone and come off the end, it is necessary to scoop and pump the ambient or streamwise flow of air into and under the engine thrust flow containing the noise.

When the panels are translated aft and opened to extend laterally on each side of the nacelle, they may work aerodynamically against the horizontal stabilizer if they are not properly designed. However, due to the relatively small area required by the panels to be effective as a noise shield (with the injection of the intermediate flow) in comparison with the area of the horizontal stabilizer, the effectiveness of the panels as a destabilizing influence can be neglected at the relatively slow aircraft speeds during takeoff and landing. For cruise flight speeds however, it would be necessary to retract and close the panels in order to affect as little as possible the aerodynamic action of the horizontal stabilizer.

An advantage of the present invention is that it reasonably provides approximately 15 percent noise reduction, whether it is incorporated into a high bypass ratio engine or a low bypass ratio engine. Although the actual dimensions may have to be somewhat different, the proportions of noise shield size relative to exhaust nozzle diameter, etc., as set forth infra, would be equally applicable to either a high or a low bypass ratio engine.

DESCRIPTION OF THE PREFERRED EMBODIMENTS

Figure 1:
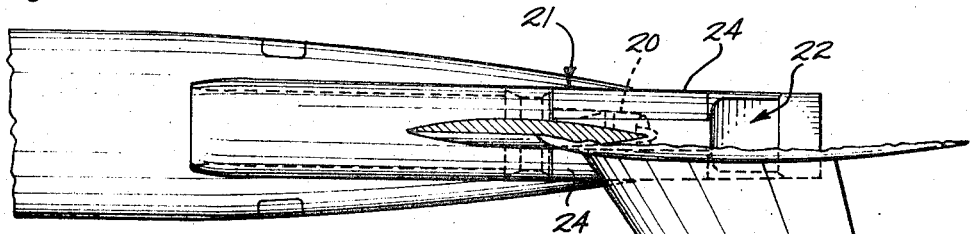
FIG. 1 is a plan view of a high bypass turbofan engine mounted in the tail portion of an aircraft fuselage having a T-tail and an air inlet duct on top of the fuselage. In the upper portion of the figure, the horizontal stabilizer has been removed to more clearly show the noise shield in the stowed position.

FIG. 1 is a plan view of the sound suppression apparatus of the present invention as installed on a high bypass turbojet engine 20 which is mounted in the tail portion of an aircraft fuselage. The engine is housed within a nacelle structure 21 and exhausts through a duct 22 and exhaust nozzle exit plane 23. A pair of noise shields or panels 24 are mounted adjacent to the engine section and are in parallel with the external sides of the engine nacelle when in the stowed position. The panels 24 are longitudinally translatable through a cable and pully mechanism, to a position aft of the engine enclosure; and in so doing, are opened outwardly, as shown in the rear view of FIG. 3, about a longitudinal hinge 26 so as to partially enshroud the exhaust nozzle flow at the exit plane 23.

Figure 2:
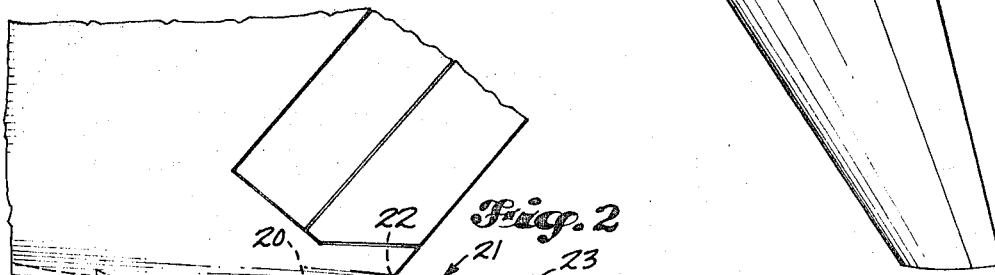
FIG. 2 is a side elevational view of FIG. 1 and shows the noise shield device in the aft and extended position on the side of the fuselage.
Figure 5:
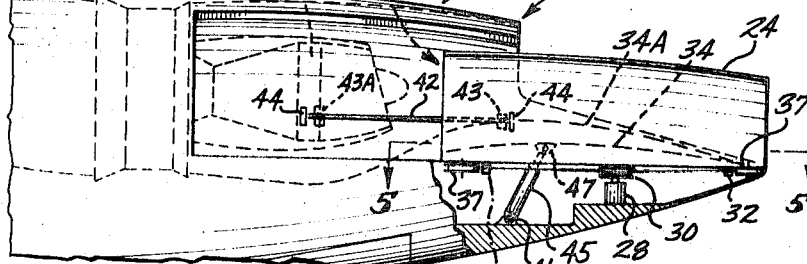
FIG. 5 is a sectional view taken at 5—5 of FIG 2. and schematically depicts the cable and pulley mechanism for translating the noise shields.
Figure 5:
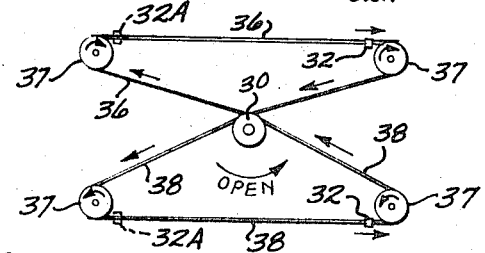
Figure 3:
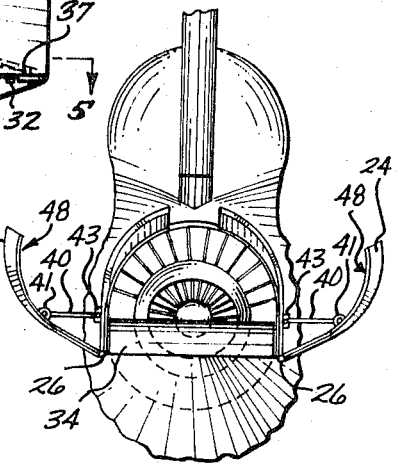
FIG. 3 is a rear view of FIG. 2.
Figure 4:
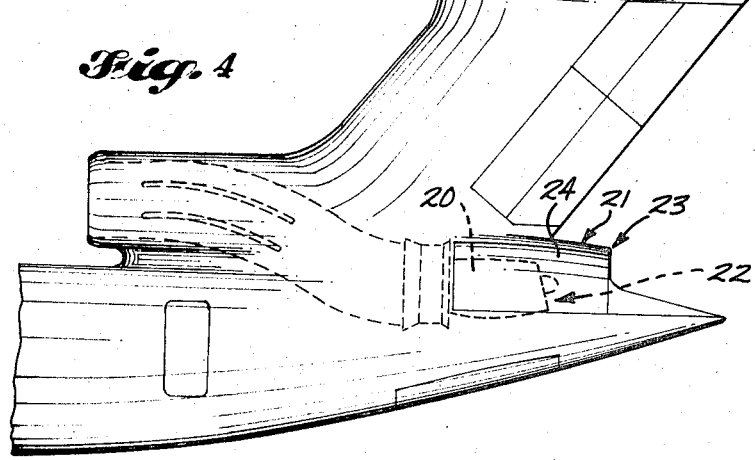
FIG. 4 is a side elevational view of FIG. 1 and shows the noise shield in the forward stowed position.

FIGS. 2, 3, and 5 show the mechanism for operating the panels 24 and the variable ramp 34. For translating the panels 24 from their forward closed position to their aft and open position, a cable and pulley system is utilized comprising: a motor 28 rotating a cable drum 30 in a counter-clockwise direction which in turn, pulls the two cable loops, 36 for the right hand side and 38 for the left, around the pulleys 37 in the direction indicated in FIG. 5. The panels 24 are mounted to aircraft structure for longitudinal sliding movement on hinge connection 26 or they could be attached to the aircraft by a sliding carriage arrangement (not shown). The panels 24 are connected to the cable loop systems, 36 and 37, through fitting 32. The fitting 32 moves from its forward position 32A shown in dotted outline, to its aft position 32 shown in solid outline, as the panels 24 are translated along the longitudinal hinge 26 from their forward stowed position to their aft extended position. Also, as the panels 24 are translated aft, they are opened outwardly by a link 40, which is pivotally connected at one end to the panels 24 at 41 and slidably connected at the other end to a track 42 through a track slide fitting 43. The link fitting 43 moves from its forward position 43A to its aft position 43 as the panels are translated from their forward to aft position. When the panels 24 are in their forward closed position, the link 40 (which is spring biased to close the panels 24) is positioned substantially parallel to the track 42 such that the link pivotal connection 41 to the panel 24 is forward of the link slide fitting connection 43 to the track 42. As the panels 24 are translated aft, the spring biases link 40 retains the panels 24 in the closed position and as the link fitting 43 slides aft along the track 42, it engages a track end stop 44 whereat further aft movement of the panels 24 causes the forward link connection 41 to swing out to a transverse position thereby moving the panels 24 to their outboard open position.

The lower surface of the exhaust nozzle duct 22 comprises a vertically adjustable surface or variable ramp that is raised to the position indicated by the upper dotted line 34A by extending linear actuator 45. One end of actuator 45 is connected to nacelle structure at 46 and the other end is connected to the ramp 34 at 47.

During high speed cruise flight of the airplane, the variable ramp 34 is in the raised position 34A and the panels 24 are forward and closed against the side of the fuselage. In this position, the predetermined shape of an efficient high speed cruise nozzle is formed.

During low speed flight of the airplane, such as take-off and landing, the variable ramp 34 is lowered and the panels 24 are forward and closed against the side of the fuselage. In this position, the predetermined shape of an efficient high speed cruise nozzle is formed.

During low speed flight of the airplane, such as take-off and landing, the variable ramp 34 is lowered and the panels 24 are translated aft and opened to a laterally extended position. When the panels 24 are in the open position, their vertical section or sides in plan view, converge in an aft direction so as to form a scooping action on the airstream flow adjacent to the fuselage, and function to direct the air flow into the exhaust flow. Also, as is more clearly seen in the side view of FIG. 2, the ramp 34 extends aft beyond the exhaust nozzle exit plane 23 when the panels 24 are in their forward stowed position; therefore, when the panels 24 are translated aft and opened outwardly, they function in combination with the ramp 34 to form an upward opening exhaust nozzle wherein the effective exhaust nozzle exit has now been extended aft to a position at the terminus of the ramp 34. In addition to the substantial increase in the exhaust nozzle area for decreasing the exhaust flow velocities and thereby attenuating the exhaust noise, the inner surface of the panels has an acoustic lining 48 which further attenuates the exhaust noise for the sound suppression mode of airplane operation. It is necessary that the ramp 34 be lowered far enough below the engine thrust flow or below an aft extending cross-sectional profile of the exhaust flow through duct 22 so that the panels 24 can scoop the free airstream flow into and underneath the engine thrust flow which contains the noise. This creates an intermediate fluid flow or mixed boundary layer region between the engine thrust flow and the surfaces of the aft extending ramp 34 and panels 24. This intermediated fluid flow is formed to separate or reflect the engine and turbofan noise contained in the thrust flow so that it won't follow the contour of the aft extending surfaces of the ramp and panels. In this manner the noise is suppressed throughout the length of the ramp and panel members, and is deflected upwardly of the aircraft.

The size of the panels 24 or the noise shield deflecting area, when in the extended open position, is proportional to the diameter of the jet exhaust nozzle. The noise shield is approximately three diameters long and three diameters wide. In order to reduce side line noise the shield should have some vertical deflecting area, and as seen in the rear view of FIG. 3, the panels 24 when in the open position cover up approximately fifty percent or more of the nozzle's height. The leading edge of the extended panel 24, as seen in the side view of FIG. 2, projects forward of the nozzle opening by a distance of approximately one-fourth of the nozzle diameter, for both the sideline noise shielding and under the nozzle noise shielding. From the rear view of FIG. 3, the panels 24 when in the extended or open position should have their vertical surface portion located adjacent to the side of the nozzle at a distance of approximately one nozzle diameter. Also, the inner or hinged edge 26 of the clamshell panels 24 or their intersection with the exhaust nozzle, should be such as to permit a clear area under the exhaust flow 22 of a clearance height of approximately one-fourth nozzle area or diameter. This is to permit the introduction of the free airstream flow under the exhaust flow (containing the jet engine noise) and thereby reflect the noise upwardly. Also, the ramp 34 which forms the lower surface of the exhaust nozzle, has to be moved downward a predetermined distance of approximately one-fourth nozzle diameter in order that the intermediate free airstream flow can be directed under the engine thrust nozzle flow from duct 22.

While the invention has been disclosed with reference to a preferred embodiment, it is to be understood that those modifications and changes which become obvious to a person skilled in the art as a result of the teachings hereof, will be encompassed by the following claims.

What is claimed is:

1. A noise shielding apparatus for the exhaust nozzle flow in jet aircraft engines comprising
a pair of shield members mounted for longitudinal movement along opposite sides of the exhaust nozzle, said shield members extending in the vertical direction to cover a minimum of fifty percent of the height of the exhaust nozzle when in a fully extended position, first means for moving the shield members rearwardly to extend beyond the exhaust nozzle exit plane a distance at least approximately three nozzle diameters, the leading edges of said shield members extending forwardly of the nozzle opening by a distance of at least approximately one-fourth of the nozzle diameter when the shield members are in their fully extended position, second means for moving the shield members outwardly to scoop atmospheric airflow adjacent the exhaust nozzle, a variable ramp forming the lower surface of the exhaust nozzle when in a first position, means for moving the variable ramp between the first position and a second position located below said first position a distance approximately equal to one-fourth of the nozzle diameter, whereby the atmospheric airflow is forced between the exhaust nozzle flow and the shield members, said variable ramp surface forming an extension of and connection between said shield members when in its second position.

2. The combination according to claim 1 wherein said shield members are mounted for longitudinal sliding movement on hinge connections positioned a distance approximately equal to one-fourth of the nozzle diameter below said first position of said variable ramp.

* * * * *